United States Patent [19]
Biffle

[11] 3,934,887
[45] Jan. 27, 1976

[54] ROTARY DRILLING HEAD ASSEMBLY

[75] Inventor: Morris S. Biffle, Midland, Tex.

[73] Assignee: Dresser Industries, Inc., Dallas, Tex.

[22] Filed: Jan. 30, 1975

[21] Appl. No.: 545,507

[52] U.S. Cl. .................................. 277/31; 277/72 R
[51] Int. Cl.² ....................... F16D 3/06; F16J 15/16
[58] Field of Search .................. 277/31, 65, 72, 9

[56] References Cited
UNITED STATES PATENTS

| | | | |
|---|---|---|---|
| 2,853,274 | 9/1958 | Collins | 277/31 X |
| 2,927,774 | 3/1960 | Ormsby | 277/31 X |
| 3,387,851 | 6/1968 | Cugini | 277/72 X |
| 3,724,862 | 4/1973 | Biffle | 277/31 |

*Primary Examiner*—Samuel B. Rothberg
*Attorney, Agent, or Firm*—Marcus L. Bates

[57] ABSTRACT

A rotary drilling head assembly having a main body through which an axial bore is formed for sealingly receiving, in an axially rotatable and longitudinally slidable manner, a driving member therethrough, thereby enabling the driving member to be moved longitudinally respective to the head while it is being axially rotated by the turntable.

An outflow passageway conducts fluid flow away from the head, while a second seal means controls fluid flow between the relative rotating parts of the assembly.

15 Claims, 6 Drawing Figures

ROTARY DRILLING HEAD ASSEMBLY

BACKGROUND OF THE INVENTION

In my previous U.S. Pat. No. 3,724,862 which issued Apr. 3, 1973, there is disclosed a rotating blow-out preventor, hereinafter called "RBOP", having associated therewith a seal means for preventing contamination of various moving parts thereof. Reference is made to this issued patent for further background of the invention.

In my co-pending patent application, Ser. No. 339,037 filed Mar. 8, 1973, now U.S. Pat. No. 3,868,832, granted Mar. 4, 1975 there is disclosed improvements in RBOP, which enable rapid replacement of a stripper rubber which receives a tool string therethrough. Reference is made to this patent application as well as the art cited therein for further background of the invention.

In making hole with a rotary drilling rig, sometime formations are encountered such that several days will expire between trips for replacement of the drill bit. Such an occurrence is always favorably received by the Roughnecks for the reason that they can lounge about the rig or recline in the doghouse, since the only work that must be accomplished is an occasional addition of another joint of drill pipe to the Kelly. In making a deep hole, should the RBOP become unduly worn, a dangerous situation exists because a pocket of gas might be encountered and control of the well will thereby be lost. This is, of course, a catastrophic occurrence in the oil patch.

Therefore, it is desirable to have an RBOP designed in such a manner to enable the stripper, as well as the bearings and various seals associated therewith, to be replaced without the necessity of removing the massive main housing of the RBOP from the upper extremity of the surface casing.

SUMMARY OF THE INVENTION

This invention relates to oil field equipment and specifically to a rotary drilling head assembly having a main body through which an axial bore is formed for receiving a driving member therethrough, with the driving member and the drilling head cooperating to form an annulus therebetween. A rotatable stripper means slidably receives the axially rotatable driving member in sealed relationship therethrough. The stripper means is journaled for rotation to the main body of the head such that the annulus which is formed between the driving member and the head is divided into an upper and lower annular area. The lower portion of the lower annular area is flow connected by piping at a location below the stripper means so that drilling mud can flow up the borehole annulus about the driving member and out of the rotating head.

A seal means is affixed between a stationary and rotatable part of the head assembly at a location spaced above the outflow passageway and adjacent to the stripper means for preventing flow from the upper extremity of the lower annulus outwardly from the RBOP. The last said seal means comprises a fixed and a rotatable member, with the fixed member being connected to the stationary main housing while the rotatable member thereof is suitably affixed to structure associated with the rotatable stripper.

Hence, the stripper means prevents fluid flow from the lower to the upper annulus, while the seal means prevents fluid flow from the upper extremity of the lower annulus outwardly from the main body, thereby enabling fluid flow to occur down the interior of the driving member, to the bit, back up the borehole annulus, and out of the lower RBOP annulus to the mud pit.

Accordingly, a primary object of this invention is the provision of rotary drilling head assembly which sealingly engages a driving member placed therethrough so that the driving member sealingly engages the head while it is rotated about its central longitudinal axis as it moves longitudinally into or out of the borehole.

Another object of the invention is to provide improvements in a rotating seal member associated with a rotary drilling head.

A further object of this invention is to disclose and provide improvements in a combination stripper and seal means for use in conjunction with a RBOP.

A still further object of this invention is to provide a rotatable stripper means associated with a RBOP having one seal surface thereon for receiving a tool string therethrough and another seal means thereon for sealingly engaging a stationary member associated with the main body of the drilling head.

Another and still further object of the invention is to provide a drilling head assembly having a rotatable stripper means and a fluid seal member, each of which sealingly engage a rotating tool string which is received therethrough in a manner to control flow of fluid into and out of a borehole during wellbore forming operations.

An additional object is to provide a RBOP for sealingly engaging a fluid conducting rotating tool string so that control of fluid flowing through the tool string and back up through the borehole annulus is forced to flow along a controlled flow path.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENT

Figure 1:
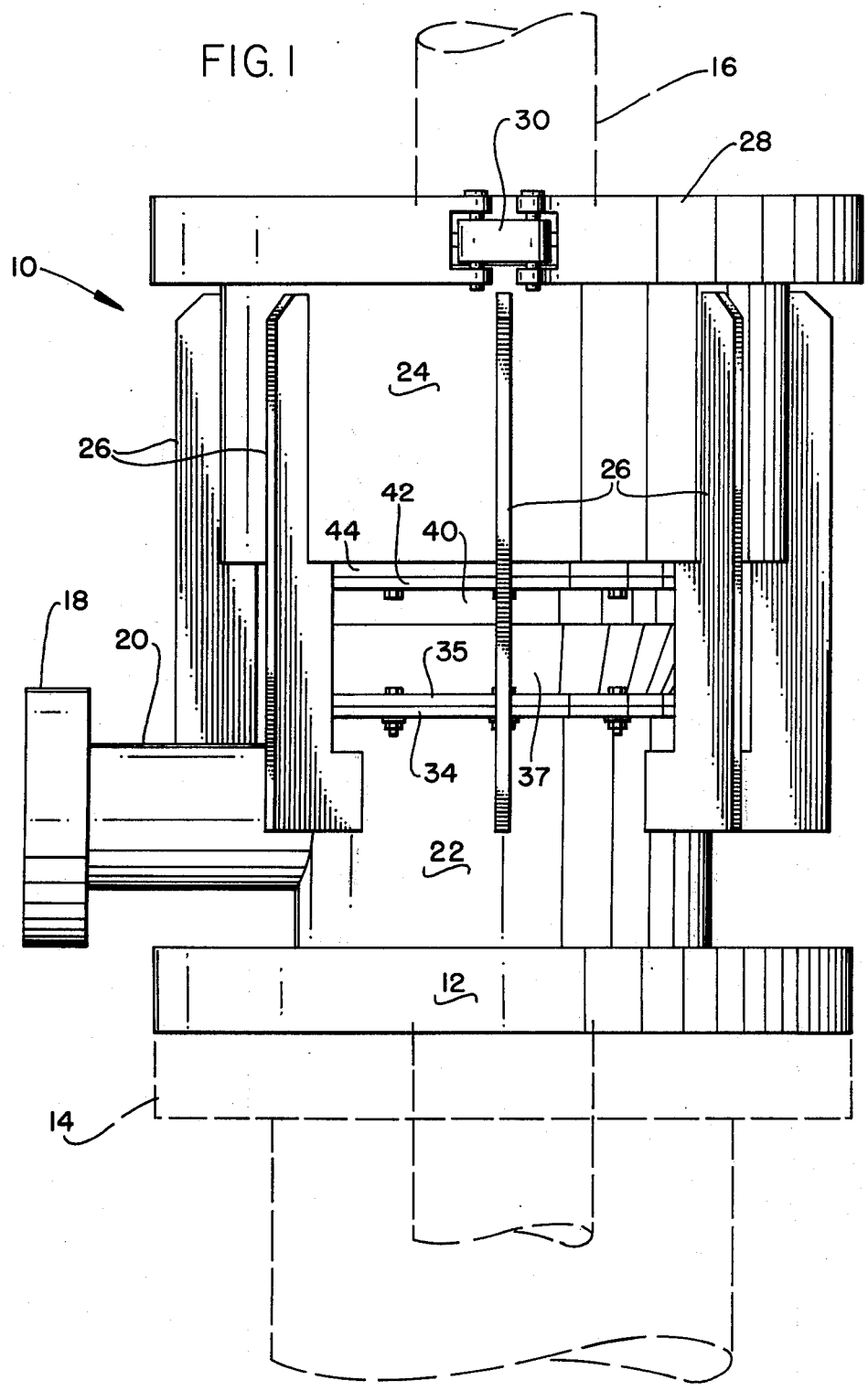
FIG. 1 is a side elevational view of the preferred form of the present invention, with additional structure being associated therewith and disclosed in phantom representation.

In FIG. 1, in conjunction with the remaining figures, there is disclosed a rotary drilling head assembly, or RBOP, having a main housing which terminates at the lower extremity thereof in a flange 12 so that the entire assembly can be connected to an upwardly directed mating flange 14 of a borehole casing; thereby enabling a driving member 16, such as a rotating toolstring, to be sealingly received in a longitudinally slidable manner therethrough. An outlet flange 18 enables an outflow pipe 20 to conduct fluid flow from the borehole annulus, not shown, to a location removed from the borehole and the RBOP.

The main housing of the RBOP of the present invention is comprised of a lower stationary housing 22, an upper stationary housing 24 rigidly affixed to the lower housing by a plurality of outwardly directed, radially spaced apart, vertically disposed flanges 26. The flanges rigidify the entire main housing and reduce the cost of fabrication, while at the same time significantly reduce the gross weight thereof.

A split clamp assembly 28 is journaled together by hinge means 30, and fastened into a complete circle by a fastener means 32, so that the fastener means can be released and the split clamp halves pivoted apart and about the hinge means for the purpose of replacing all of the wearing components of the RBOP, as will be described in greater detail later on in this disclosure.

A stationary circumferentially extending flange 34 is connected to the lower housing member so that a complementary flange 35 can be bolted thereto with an o-ring 36 being interposed therebetween for preventing fluid flow across the interface formed therebetween. The co-acting flanges removably and rigidly affix a circumferentially extending upwardly and outwardly tapered conical seal seat member 37 to the lower housing. The seal member hereinafter will be called a "stationary seal member". Numeral 38 broadly indicates the internal circumferentially extending interface formed by engagement of the stationary seal member and the lower housing.

An elastomeric stripper means 40, hereinafter called a "stripper", is provided with a reinforced outwardly directed, horizontally disposed flange 42, which is provided with a bolt circle so that it can easily be bolted onto a complementary flange 44 of a rotating bowl assembly, with conventional seal means 46 being interposed therebetween as may be desired. The stripper, which can be reinforced with metal fingers and various other metallic and non-metallic devices accepted in the various prior art designs, has a lower inwardly tapered circumferentially extending end portion 48, and a reduced inside diameter formed by the interior sealing surface 50 which sealingly engages the exterior surface of a driving member, such as a toolstring, slidably forced therethrough.

Circumferentially disposed, outwardly positioned, rotating seal member 52 forms part of the rotating seal means and is rigidly affixed to flange 42 and hence to the stripper, and preferrably is formed with annulus 56 disposed between the stripper and the rotating seal member so that a marginal end portion of the seal member sealingly engages the inside annular seat surface 58 of the fixed seal member; thereby precluding fluid flow across members 52 and 58.

A stationary bowl in the form of a hollow tapered plug 60 is seated in close tolerance relationship within the upper housing and is rigidly attached in a removable manner by the before mentioned split clamp. A rotating bowl 62 is spaced from the tapered bowl, thereby leaving annulus 64 therebetween, within which a lubricant can be supplied. Tapered roller bearings, 66 and 68, are spaced from one another and positioned within the annulus so that the rotating bowl is rotatably held against upthrust and downthrust, and is rotatably received in low friction relationship within the removable tapered stationary bowl.

Upper and lower seals, 70 and 72, which can take on any number of different forms, are positioned externally of the roller bearings and prevent contamination thereof. Nut 74 threadedly engages the stationary tapered bowl for securing the upper bearing seat thereto, while hold-down plate 76 is provided with a ledger plate about a circumferentially extending marginal extremity, which greatly minimizes inward travel of debris toward the bearing seals, thereby forming a slinger ring respective to the various inter-acting movable parts. Fastener 77 rigidly affixes the rotating slinger ring to the rotating bowl assembly in close proximity to the nut 74.

Figure 6:
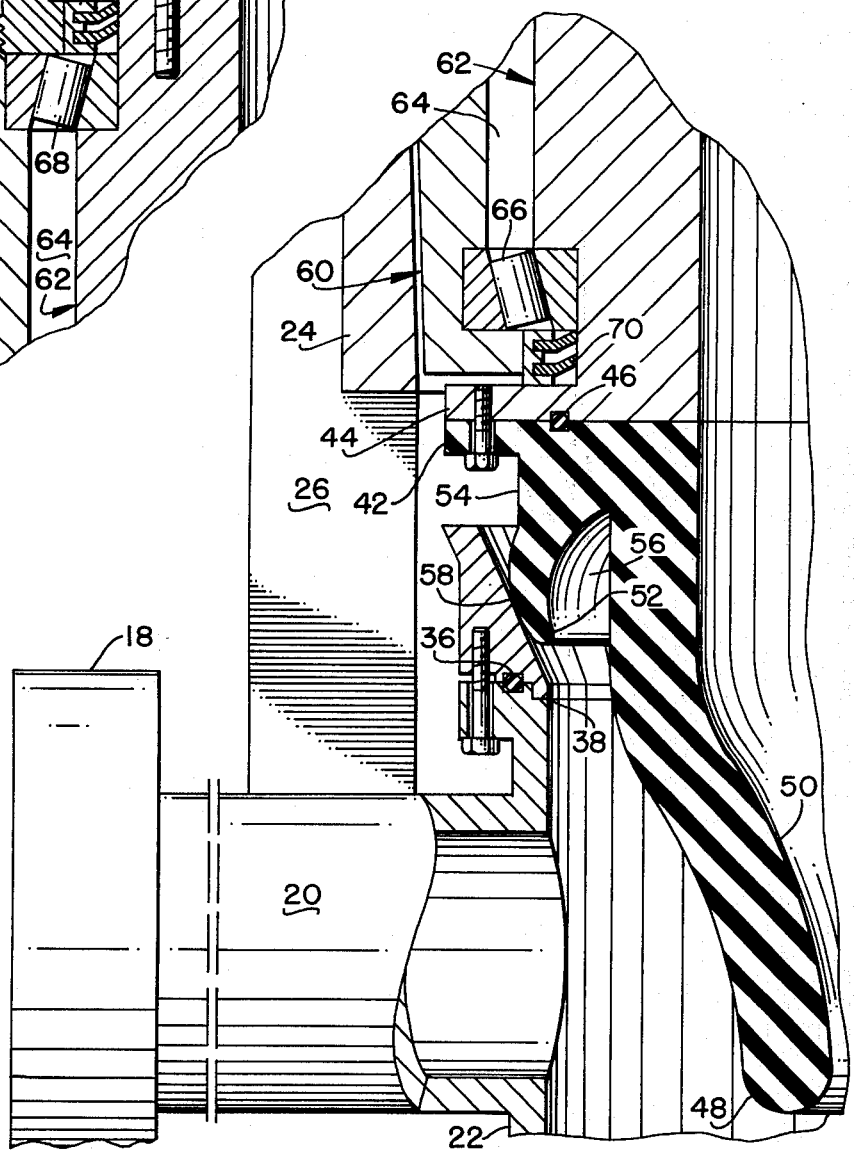

The apparatus of the present invention is assembled by bolting flanges 34 and 35 together by the illustrated circle of bolts, thereby disposing annular seat 58 in the illustrated manner of FIG. 6. The stripper, bearings, and bearing seals are next affixed in axially aligned relationship respective to the rotating bowl, the rotating bowl is concentrically positioned within the tapered bowl, the nut 74 properly torqued against the upper tapered bearing and stationary bowl, and the slinger ring bolted into proper superimposed position by means of the circle of bolts 77.

The entire removable rotating bowl assembly, along with the stripper can now be telescoped through the upper housing into the illustrated position disclosed in the figures of the drawings, after which the split clamp is placed about the upper marginal end of the assembly so that the stationary bowl is wedgedly forced into a fixed position respective to the remainder of the apparatus.

Figure 2:
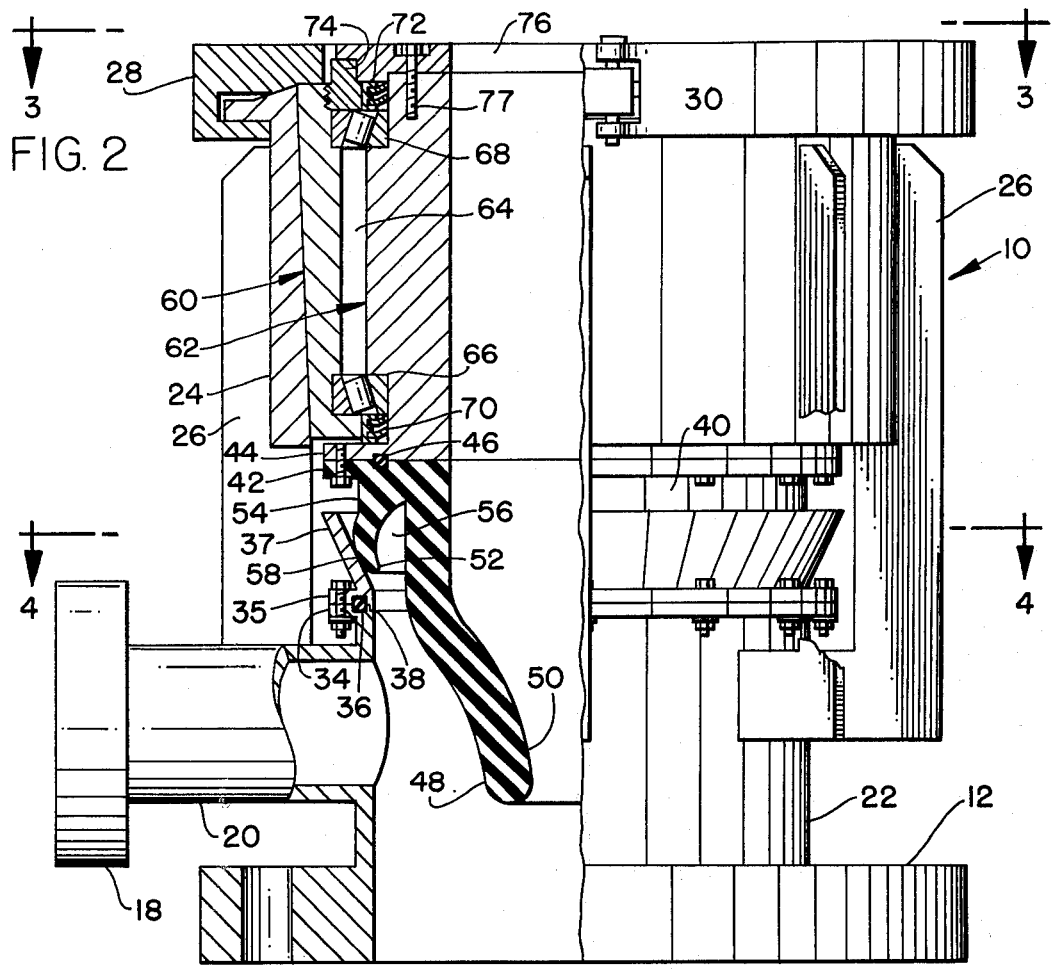
FIG. 2 is an elevational, part longitudinal, cross-sectional view of the apparatus disclosed in FIG. 1.
Figure 3:
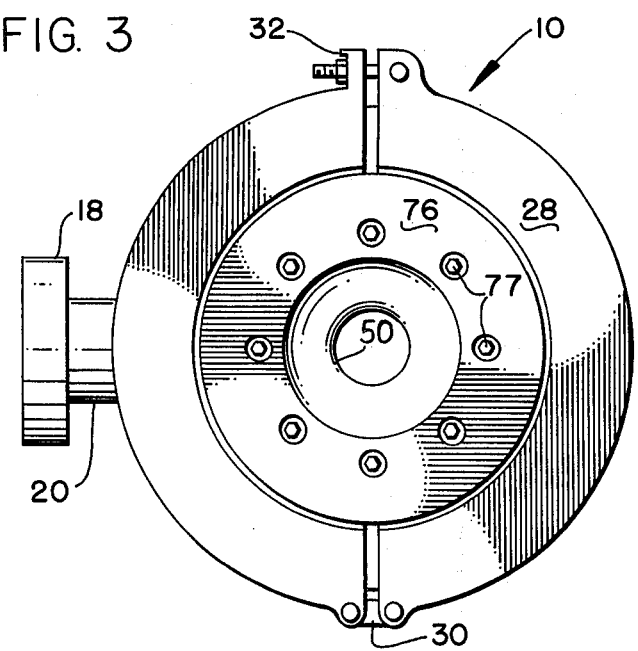
FIG. 3 is a reduced, top plan view of the apparatus disclosed in the foregoing figures, looking in the direction indicated by the arrows at numerals 3.
Figure 4:
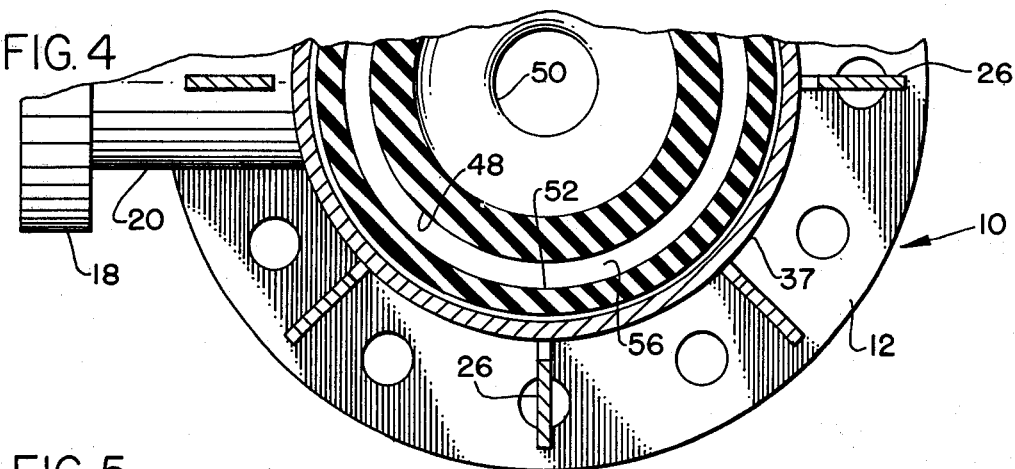
FIG. 4 is an enlarged, fragmentary, part cross-sectional view taken along line 4—4 of FIG. 2.
Figure 5:
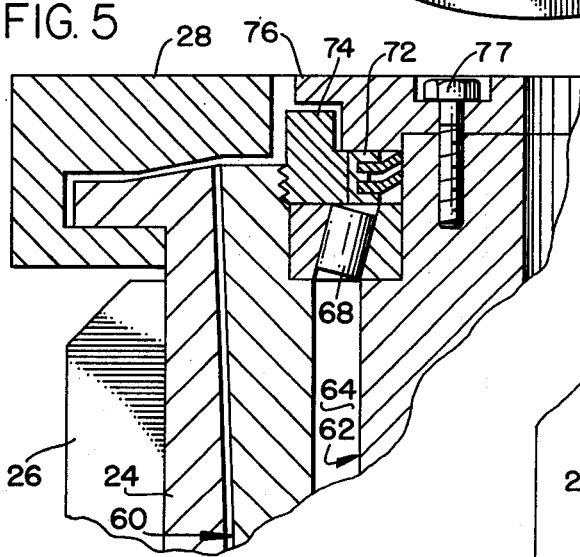
FIG. 5 is an enlarged, fragmentary, part cross-sectional view of part of the apparatus disclosed in the foregoing figures; and, FIG. 6 is an enlarged, fragmentary, part-cross-sectional representation of still another part of the apparatus disclosed in FIGS. 1–4.

The present invention accordingly provides an RBOP of a novel design and unusual configuration in that all of the moving parts thereof can be replaced at any time without removing the massive main housing from its operative relationship respective to the remainder of the borehole forming apparatus. In particular, while making hole, the RBOP of the present invention will be disposed in axially aligned and series relationship respective to any number of other safety equipment. It is therefore extremely beneficial in consideration of down-time of a drilling rig to be able to rapidly replace the entire worn mechanism. The replacement is accomplished by merely removing the split clamp, engaging either the stationary or the rotating bowl with a wire rope, and withdrawing the tapered bowl along with the bearings, seals, rotating bowl, and stripper. This novel expedient enables a new assembly to immediately be telescoped over the Kelly and into the illustrated position seen disclosed in FIGS. 1 and 2.

At the same time, should it be desirable to do so, the seat assembly can likewise be unbolted and removed up through the interior of the upper housing and up over the Kelly, thereby enabling a rebuilt seat assembly to be substituted therefor.

In the present rotary drilling head assembly for wellbore forming operations, it will be appreciated that the lower mating flange enables the main body to be affixed to either the surface casing flange, or to the uppermost flange of other BOP equipment. The main body is formed into an upper and lower stationary housing spaced from one another by the illustrated annular seat 58. The central axial bore formed through the entire apparatus enables a toolstring, or a driving member, to be received therethrough. The rotating bowl 62 can be rotatably journaled to the tapered bowl 60 by any suitable means, so long as it can endure at least as long as the stripper.

The stripper can be integrally affixed to the stripper mount means 42 and to the rotatable seal member 52; however, it is deemed to fall within the comprehension of this invention to fabricate the stripper, the mount means, and the seal member as separate, individual, bolted-together members.

The outflow pipe 20 is seen to have an inlet disposed in fluid communication with the lower area of the lower annulus, with the seal means being positioned for preventing fluid flow from a location above the illustrated inlet to the outlet pipe, outwardly therefrom. The stripper prevents fluid flow from the lower to the upper annulus.

The stripper preferably is made of an elastomeric material suitably reinforced with metal rods, metal inserts, and other mechanical devices which reinforce rubber and rubber-like resilient material and at the same time, enables sufficient deformation to occur so that it can expand into sealing engagement with various configurations of a tool string.

I claim:

1. In a rotary drilling head assembly for wellbore forming operations having a main body for connection to the upper end portion of a wellbore casing and formed into an upper and a lower stationary housing, a central axial bore formed through said upper and lower housings for receiving a toolstring therethrough, a rotating bowl rotatably journaled to the upper housing, a stripper seal means concentrically affixed to the rotating bowl for jointly rotating with and sealingly engaging a toolstring placed therethrough; and an outlet pipe connected to the lower housing in flow relationship to the axial bore; the improvement comprising:
   a circumferentially extending annular seal seat formed on said lower housing at a location spaced above the inlet to said outlet pipe; a circular rotating fluid seal means mounted to be rotated concurrently with said stripper seal means and sealingly engaging said annular seal seat.

2. The improvement of claim 1 wherein said stripper seal means and said rotating fluid seal means are made integrally with one another.

3. The improvement of claim 1 wherein said upper housing includes a stationary bowl member which is removably affixed to said main housing, said rotating bowl being journaled to said stationary bowl member, so that said stationary bowl, together with said stripper seal means, can be removed upwardly through the interior of said main housing.

4. The improvement of claim 1 wherein said annular seal seat includes means by which it is removably affixed to said lower housing so that it can be removed upwardly through the interior of said main housing.

5. The improvement of claim 1 wherein said stripper seal means and said rotating fluid seal means is made integrally with one another;
   means forming a stationary bowl which is removably affixed to said upper housing; said rotating bowl being journaled to said stationary bowl so that said stationary bowl, rotating bowl, and stripper seal means can be removed as a unit from said main housing.

6. The improvement of claim 1 wherein said upper housing has included therein a stationary bowl, means by which said stationary bowl is removably affixed to said stationary housing such that said stationary bowl together with said rotatable bowl and said stripper seal means can be removed from said main housing;
   means by which said annular seal seat is removably affixed to said lower housing so that it can be removed from said main housing.

7. The improvement of claim 1 wherein said annular seal seat includes means by which it is removably affixed to said lower housing so that it can be removed therefrom;
   said stripper seal means and said rotating fluid seal means is made integrally with one another;
   means by which said upper housing is removably affixed to said main housing so that said upper housing together with said stripper seal means and said rotating seal member can be removed upwards through the interior of said main housing, along with said stationary seal member.

8. In a rotary drilling head assembly for wellbore forming operations having an axial bore formed therethrough for sealingly engaging a rotating driving member used in drilling boreholes, the improvement comprising:
   said rotary drilling head assembly being made into concentrically aligned upper and lower chambers;
   a rotating stripper means for preventing fluid flow from said lower to said upper chamber, and a stripper mount means journaled for axial rotation to said upper chamber; said stripper means being affixed to said stripper mount means such that the rotating driving member can sealingly engage said stripper means while an annulus is formed between said lower chamber and the driving member;
   an outflow passageway in fluid communication with the annulus, an annular seal means positioned above said passageway for preventing fluid flow outwardly from an upper extremity of the annulus, said annular seal means comprising a stationary member which sealingly engages a rotating member, and means by which said stationary member is affixed to said lower chamber and said rotating member is affixed to said stripper mount means.

9. In a rotary drilling head having an axial bore within which there is disposed a rotatable stripper for sealingly receiving a driving member in longitudinally slidable relation therethrough, with the drilling head having an upper and a lower stationary chamber spaced from one another which cooperates with a driving member placed therethrough to form an upper and a lower annulus;
   stripper mount means by which said stripper is mounted in journaled relationship to said upper chamber for concurrent rotation with the driving member, and with there being means forming an outflow pipe which is flow connected to said lower annulus for conducting fluid flow from a lower end thereof, the improvement comprising:
   an annular seal means for preventing fluid flow from an upper end of said lower annulus to a location externally of said rotary drilling head when the driving means sealingly engages said stripper;
   said annular seal means comprising first and second coacting relative rotating seal members, one said seal member being affixed to said lower stationary housing and the remaining said seal member being affixed to said stripper mount means.

10. The improvement of claim 9 wherein said stripper, said stripper mount means, and said rotatable member of said seal means are integrally formed.

11. A rotary drilling head having a main body through which an axial bore is formed for receiving a driving member therethrough, with the driving member and the drilling head cooperating to form an annulus therebetween;

a rotatable stripper means for slidably receiving the driving member for axially slidable movement therethrough, means including a stripper mount means by which said stripper means is connected in journaled relationship for rotation to said main body such that the annulus is separated into an upper and a lower annular chamber, with fluid flow from one chamber to the other chamber being prevented by said stripper means when the driving member is received therethrough;

means forming an outflow passageway connected to a lower extremity of said lower annulus so that flow can occur to a location spaced from said main body;

means forming a seal member at a location above said outflow passageway for preventing fluid flow outwardly from an upper extremity of said lower annular chamber, thereby precluding flow along a flow path other than said outflow passageway; said seal member comprising a fixed seal member and a rotatable seal member which sealingly engage one another such that flow cannot occur thereacross; means by which said fixed member is affixed to said main body; and, means by which said rotatable seal member is affixed to said stripper mount means.

12. The rotary drilling head of claim 11 wherein said main body includes a lower housing and an upper housing, a rotatable sleeve journaled for rotation within said upper housing; said lower annular chamber being formed by said lower housing and said upper annular chamber being formed by said rotatable sleeve; said fixed seal member being connected to said lower housing, said rotatable seal member being affixed to said rotatable sleeve by said stripper mount means.

13. The head of claim 12 wherein said stripper means and said rotatable seal member are affixed to one another and rotatably secured to said upper housing.

14. The rotary drilling head of claim 11 wherein said main body includes a lower housing and an upper housing, a stationary bowl received within said upper housing, a rotating bowl received within said stationary housing, said lower annular chamber being formed by said lower housing and said upper annular chamber being formed by said rotatable bowl; said fixed seal member being connected to said lower housing;

means by which said stripper means and said rotatable seal member are attached to said stripper mount means, and said stripper mount means is removably affixed to said rotating bowl; whereby said stripper means and said rotatable seal member can be removed through said axial bore.

15. The rotary drilling head of claim 14 wherein said fixed seal member is removably affixed to said lower housing, so that after said stationary bowl has been lifted free of said main housing carrying therewith said stripper and said rotatable seal means, said fixed seal member can likewise be removed through said axial bore, to thereby enable said fixed and rotatable seal member, along with said stripper means, to be replaced by withdrawal upwards through said main housing.

* * * * *